March 2, 1948. F. J. LANDGRAF ET AL 2,437,201
SYNCHRONOUS ELECTRIC CLOCK MOTOR
Filed June 16, 1947 2 Sheets-Sheet 1
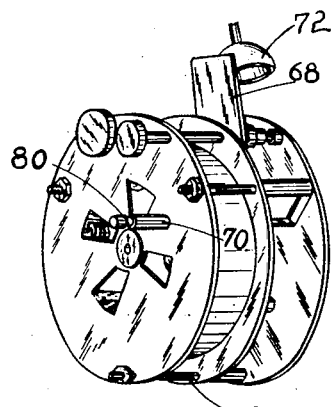
FIG 2
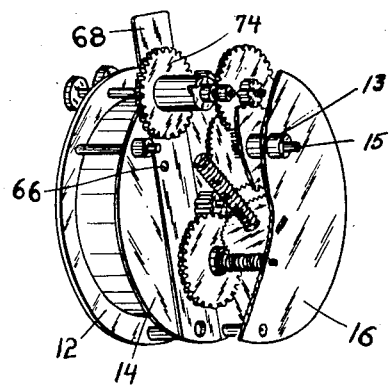
FIG 1
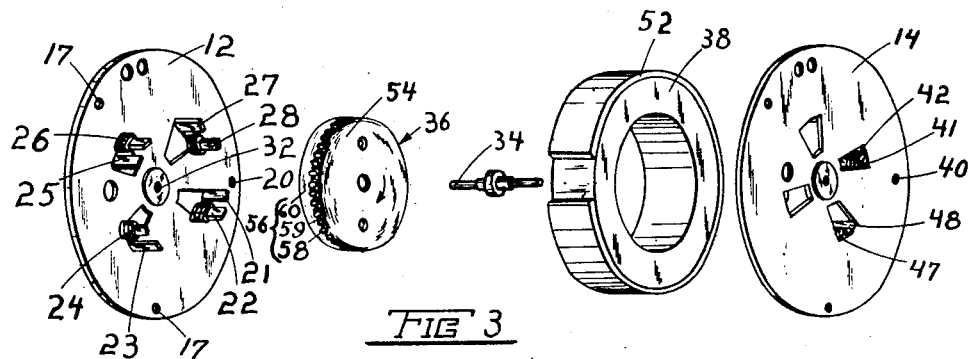
FIG 3
FIG 8
FIG 4
Inventors
Francis J. Landgraf
Richard P. Landgraf
By McLaughlin & Wallenstein
Attorneys

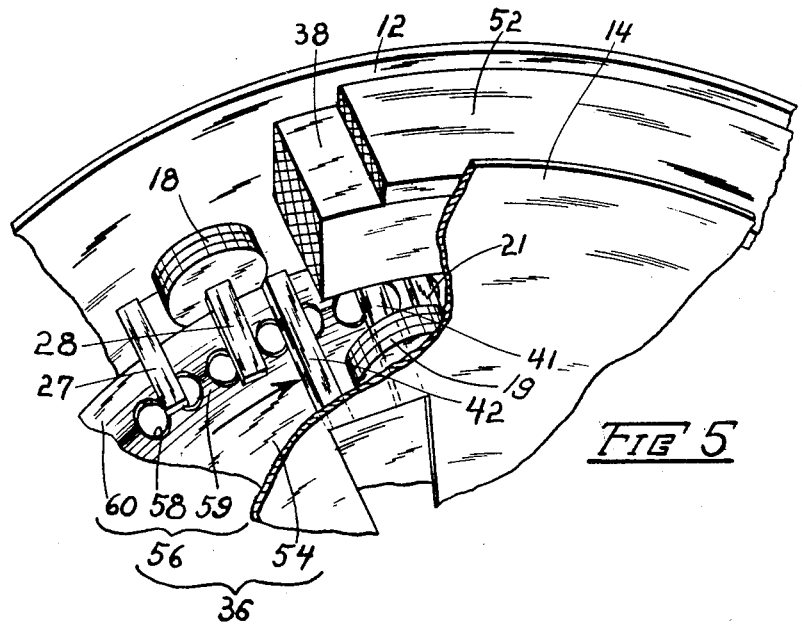
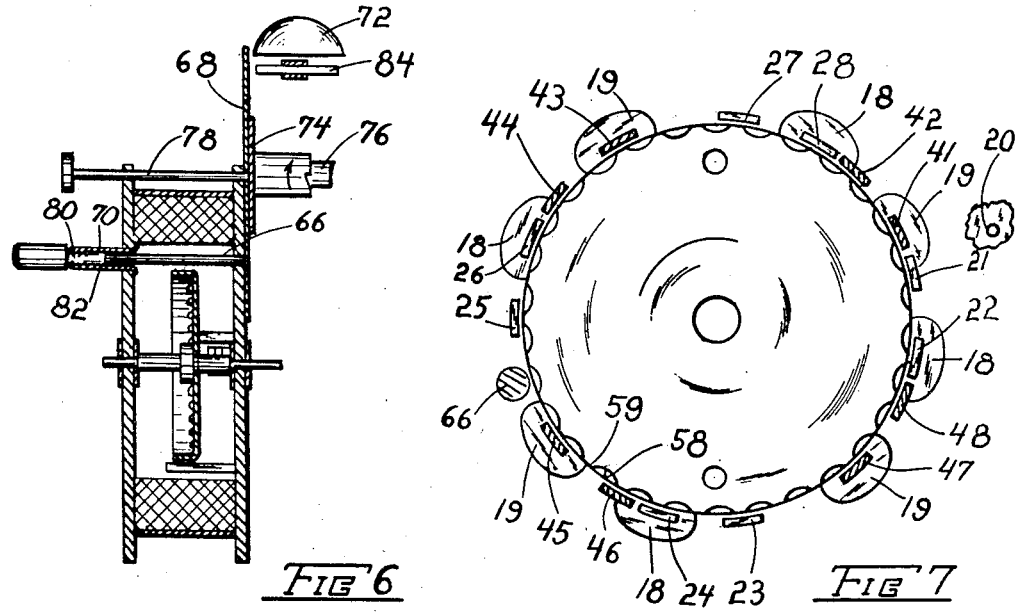

Patented Mar. 2, 1948

2,437,201

UNITED STATES PATENT OFFICE 2,437,201

SYNCHRONOUS ELECTRIC CLOCK MOTOR

Francis J. Landgraf and Richard P. Landgraf,
Chicago, Ill.

Application June 16, 1947, Serial No. 754,890

12 Claims. (Cl. 172—278)

1

The present invention relates to synchronous motors for electric clocks.

A clock motor must, first of all, keep time. Therefore, it must run dependably at one speed, that is, in synchronism with the alternations of its power supply. It should consume very little electric power but must deliver ample mechanical power to drive the clock and its alarm mechanism. It is desirable also that the motor run at a very low speed to minimize wear and noise, and that the motor be small and simple in construction.

For certain uses, it is desirable that the motor start automatically when power is applied, but self-starting motors generally require precise and expensive construction, and higher speeds to make them keep time. It has been known that lower motor speeds may be had by increasing the number of poles, but at the expense of reduced mechanical power and often also at the expense of increased size. Heretofore, we have known of no commercially-successful, self-starting clock motor running slower than 450 revolutions per minute. In non-self-starting motors, high synchronizing torque and good time keeping ability have been obtained by a toothed rotor-structure each tooth constituting a pronounced pole projecting out from the rotor body toward the pole pieces. Such a rotor structure, when used with the usual shifting field of shaded-pole self-starting motor will fail to start automatically, but if started manually will keep good time. Accordingly, pronounced poles have not been used on rotors of self-starting clock motors. These factors have tended to require self-starting motors to be larger, or more elaborate, or to run at higher speeds than non-self-starting motors, and they have made self-starting clocks less dependable but more expensive.

For example, low-speed, self-starting, clock motors heretofore known have shown a tendency to deviate from their correct speed. They would gain or lose anything from a few minutes to several hours during a 12 hour run when they were not manufactured to the necessary close tolerances. Such erratic motors have even been found on the market, and the fact that they appeared there is indicative of the difficulty inherent in the constructions heretofore known.

One object of the invention is to provide an improved self-starting motor with high starting torque, high synchronous lock-in torque, low synchronous speed, and the ability to stay in synchronism.

A further object is the provision of a clock and

2 motor of simple construction that may be easily dismantled and reassembled by a jeweler for the replacement of coils and for making other repairs.

In the preferred embodiment of the invention, the energizing coil of the motor lies between two field plates from which pole pieces extend inside the coil. A rotor has a rim-like magnetic portion one edge of which has 30 evenly-spaced perforations so that the pieces between the perforations constitute pronounced poles, and the other edge of which presents an unperforated, continuous, magnetically-smooth track to the pole pieces. The pole pieces are arranged in 4 pairs in a circle on each plate, unevenly spaced in the circle so that each pole-piece on each plate lies in a similar relation to the pronounced poles of the rotor. Furthermore, the plates are so oriented with respect to each other that the pairs of pole-pieces are themselves paired and grouped. One pole piece of each pair has a conducting loop for "shading" it to make the motor self-starting and to provide high torque at subsynchronous speeds. The device runs at the synchronous speed of a 30 pole motor, that is, at 240 R. P. M. on A. C. at 60 cycles/sec. An alarm buzzer is actuated by a magnetic rod lying between the pole pieces and within the energizing coil of the motor.

These and other objects and advantages will appear in the following description of a specific construction embodying the invention in its preferred form.

In the drawings:

Fig. 1 is a pictorial front and side view of a clock works embodying the present invention, a part being cut away to better reveal the gear train;

Fig. 2 is a pictorial side and back view of the clock works of Fig. 1;

Fig. 3 shows the part of the electric motor that is included in the device of Fig. 1;

Fig. 4 is a dimensional view of one of those parts;

Fig. 5 is an enlarged, fragmentary, pictorial view of the motor;

Fig. 6 is a section through the motor taken along a meandering line to show both the rotor and pole piece relationship, and also the alarm device;

Fig. 7 is a partially-diagrammatic, front view of the rotor, pole-pieces, and alarm actuator for showing their specific arrangement and for aiding the explanation of their operation; and Fig. 8 is a pictorial view of a modified rotor construction.

Figs. 1 and 2 show a complete clock movement. It includes an electric motor that is contained between plates 12 and 14, a gear train supported on plates 14 and 16, and an alarm mechanism. Sleeve 13 and shaft 15 are adapted to carry the usual hour and minute hands of the clock. The motor is shown disassembled in Fig. 3. The plate 12, which constitutes part of the field structure of the motor is made of soft steel and has four pairs of tongue-like pole-pieces 21 to 28, inclusive, cut from the plate and bent out perpendicular to the plate. A shading coil 18 encircles one pole-piece of each pair. At the center of plate 12 is a bearing 32 for shaft 34 which carries a rotor 36 for rotation inside the circle of the pole pieces 21, etc. An energizing coil 38 encircles the pole pieces as is shown in Figs. 5 and 6. The plate 14 has similar pairs of pole pieces 41 to 48, inclusive, that lie between those of plate 12. A soft steel ring 52 which encircles the coil, and the two plates 12 and 14 constitute the magnetic field structure of the motor. Since the pole pieces and the rotor 36 lie entirely within this structure, it prevents stray fields from appearing outside of the motor and so permits the plate 16 and various parts of the gear train to be constructed of steel. The pole pieces 21 to 28, inclusive, and 41 to 48, inclusive, are struck out from their respective plates 12 and 14 in such a manner as to leave central spokes in the plates for supporting the bearings 32 so that there is a minimum amount of magnetic material opposite the interior of the rotor 36 thus reducing eddy current losses and drag in the rotor by reason of the rotation of the rotor web 54 in the magnetic field between plates 12 and 14. This arrangement also tends to concentrate the magnetic field in the pole pieces by reducing the flux path in plates 12 and 14 in areas where a good magnetic path is undesirable.

The rotor 36 is dish-shaped, is constructed of hardened steel, which has high magnetic retentivity, and includes a web 54 and a narrow cylindrical rim 56. Thirty uniform, evenly-spaced perforations 58 occupy about half of this rim. They lie along that edge of the rim next to the web 54 and extend slightly into the web itself. Their diameter measured along the rim is greater than the width of the material left between the perforations. The other half of the rim is imperforate and presents a continuous, magnetically-smooth track 60 to the magnetic field of the pole pieces. The narrow pieces of magnetic material 59 remaining between the perforations 58 constitute pronounced poles for the rotor 36, and aid the magnetic hysteresis of the rotor in opposing a migration of the magnetism in the rotor. That is, the pronounced poles 59 provide localized positions of magnetic preference and so make the rotor lock into step with the alternations of the alternating current at the speed of a 30-pole motor, which is 240 R. P. M. at 60 cycles/sec. The imperforate half 60 of the rotor rim makes the motor self-starting and also provides a stronger and smoother component of torque at sub-synchronous speeds.

As is shown in Fig. 4, the pairs of pole pieces are spaced about the plate 12 at angular spacings of 96, 96, 96, and 72 degrees which are equivalent respectively to 8, 8, 8, and 6 of the angular intervals between the poles 59 on the rotor 36. The two pole pieces of each pair, such as 21 and 22, are separated substantially 24° or two pole intervals. Thus all of the pole pieces of the plate 12 will lie opposite rotor poles 59 simultaneously.

The pole piece structure and spacing of plate 14 is identical to that of plate 12. The shading conductors 18 and 19, of course, are assembled to the plates to make one right-handed and the other left-handed so that when assembled, as shown in Fig. 5, both tend to turn the rotor 36 in the same direction.

Field plates 12 and 14 are so oriented with respect to each other that the one of the two pairs of pole pieces that are spaced 72 degrees on one plate (such as 21—22 or 27—28) lies between those two pairs of the other plate. It will be clear that there is sufficient room for such interleaving of the poles for the reason that each pair of poles subtends an angle of 24 degrees and the pairs of poles are separated by one pole interval or 12 degrees thereby requiring a minimum angle of 72 degrees to receive two pairs of interleaved poles. This arrangement is assured by having one mounting hole 20 spaced 6 degrees, or half a pole interval, from one of the inside pole pieces (21 or 28) in the 72 degree interval as shown in Fig. 4. This hole is provided also on plate 14 in the corresponding position 40. Then when plate 14 is turned to face plate 12 these two holes are aligned by bolt 62 (Fig. 2) to bring the pairs of pole pieces of the two plates into the desired grouping. The other two mounting holes 17 preferably lie at equal angles from hole 20 so that they too may be made the same for both plates, but they lie somewhat more than 120 degrees from hole 20 so that the mounting holes will match for only the one orientation of the plates.

In Fig. 7, the rotor 26 is viewed from the front, the pole pieces 21 to 28 and shading loops 18 of plate 12 are shown in elevation and the pole pieces 41 to 48 of plate 14 are shown with cross-hatching to indicate section. To facilitate the explanation, shading loops 19 for the sectioned pole-pieces of plate 14 are also indicated although they would not so appear in a true section. As is there shown, the pair of pole pieces 21—22 of plate 12 fills the space between pairs 41—42 and 47—48 of plate 14. Similarly, pair 41—42 fills the space between pairs 21—22 and 27—28. Thus, these four pairs are closely spaced, the adjacent pole-pieces of separate pairs (such as pole pieces 21 and 41) being spaced only 12 degrees on centers, or one pole interval of rotor 36. With this arrangement, the remaining pairs of pole pieces are also paired. Thus, pairs 23—24 and 45—46 lie next each other with their adjacent pole pieces 24 and 46 separated only one pole interval of the rotor. And pairs 25—26 and 43—44 are similarly grouped. In all cases, the spacing between these groups is three pole intervals of the rotor. One other arrangement is possible. There, a pair that has a 96 degree space on both sides of it (such as pair 23—24 of plate 12, Fig. 4) is placed in the 72 degree interval of the other plate (between 41—42 and 47—48) to provide a 3, 3, 2 grouping of the pairs of pole pieces.

The alarm device includes a soft steel rod 66 (shown in Figs. 1, 6 and 7) which is riveted to a resilient metal clapper 68 and extends through plate 14, inside of coil 38, past the rotor 36 between two of the groups of pole pieces (Fig. 7), and into a non-magnetic metal tube 70 carried on plate 12. The bore of tube 70 is greater than the diameter of rod 66 so that the alternating current in coil 38 induces a pulsating magnetism in the rod 66 to cause it to vibrate and thereby actuate the clapper 68. The clapper alone produces a buzzing sound suitable for the alarm of a clock, but a bell 72 (Fig. 6) may be mounted near the clapper 68 to be struck by it. The clapper is adapted to be clamped by the usual alarm gear 74. The usual alarm-setting cam 76 permits gear 74 to slide forward on shaft 78 (to the right in Fig. 6) for releasing the clapper 68 at the time for which cam 76 is set. The alarm may be "turned off" by a rod 80 which slides in tube 70. This rod has a hollow end 82 that fits tightly over the end of rod 66 to prevent it from vibrating. Alternatively, the alarm may be "turned off" by moving a rod 84 or other blocking member against the upper end of clapper 68 as shown in Fig. 6.

Fig. 8 shows a modified rotor construction. Therein, the rim 90 of hardened steel has a smooth, cylindrical outer surface 92 and an inner toothed or indented surface 94. The teeth or thick portions 96 of the rim are of uniform width and thickness and are spaced 12 degrees apart, there thus being 30 such teeth evenly spaced. This rotor may be substituted in the construction of Figs. 1 to 7. The thick portions or teeth 96 receive and retain more magnetism, that is more lines of magnetic force than do the thinner portions 98 and so constitute positions of magnetic preference for opposing the migration of the magnetism in the rotor and so increase the synchronizing torque of the motor. The smooth, continuous outer surface of the rim enables the rotor to start automatically when power is applied to the motor coil. When the inner surface 94 is made smooth and the teeth are put on the outer surface 92, the teeth must be less prominent, that is, there must be less difference between the thin and thick portions, for obtaining the same starting and synchronizing actions. Consequently, the construction wherein the teeth are on the inside, as in Fig. 8, is preferred because it permits wider tolerances in manufacture.

It is to be noted that although our improved motor has an eight pole stator construction (8 pole pieces magnetized at 180 degree intervals of electrical phase) its speed is determined by the 30 pole construction of the rotor. The clock motor of the present invention has ample torque at starting and at all sub-synchronous speeds. It comes up to proper speed and falls into synchronism promptly. These characteristics are evidenced in part by the ability of this motor to carry over brief power interruptions without appreciable loss of time. Such brief interruptions of a fraction of a second result from the switching of power lines and occur once or twice a day on many power systems. Furthermore, the present motor need not be built to close tolerances to achieve these desirable characteristics.

Consequently, it can be dismantled for repair by jewelers and others with the assurance that when reassembled it will run properly and dependably without elaborate adjustment or other tinkering.

The construction is simple, involves few parts, and provides a dependable motor at low cost. In addition, the arrangement of the air gaps inside of the coil and inside of the field structure effectively confines the magnetism to the motor structure itself and so prevents stray fields. Consequently, the gear train and other clock parts need not be made of non-magnetic material.

While we have illustrated and explained our invention by one specific embodiment, the invention should not be construed as limited to the details thereof except as required by the claims.

What we claim as new and desire to protect by Letters Patent of the United States is:

1. In combination in a synchronous motor of the class described, a pair of magnetic plates, each plate having a plurality of pole-piece tongues integral with the plate and struck therefrom, said tongues having their roots lying on a circle, and being cut from the portion of the plate within said circle to leave spokes for supporting a center bearing, a center bearing so supported, said tongues extending perpendicular to the plate, means for spacing said plates parallel to each other with said pole pieces concentric and interspaced, a magnetic rotor carried between said plates in the center bearings thereof to be magnetically controlled by said pole pieces, and a coil lying between said plates and encircling said pole pieces.

2. The combination of claim 1 wherein said rotor includes a thin strip of magnetic material having regularly spaced perforations.

3. The combination of claim 1 wherein said rotor includes a continuous magnetic band all parts of which lie close enough to the pole-piece circle to be substantially magnetized thereby, said continuous magnetic band having regularly spaced concentrations of the magnetic material thereof providing pronounced poles.

4. The combination of claim 1 wherein said rotor has a thin rim of magnetic material with a continuous, smooth, cylindrical outer surface facing said pole pieces, the interior surface of said rim having regularly spaced, tooth-like thicker portions.

5. The combination of claim 1 wherein shading conductors are provided on only some of said pole pieces, and said rotor is of thin magnetic material having perforations spaced at regular angular intervals, and having also a continuous imperforate strip portion, said rotor lying within the circle of said pole pieces.

6. In combination in a synchronous motor of the class described, a coil, a field structure having irregularly-spaced pairs of like pole pieces disposed in a circle inside said coil, a magnetic rotor having evenly-spaced pronounced poles within the circle of said pole pieces, each of at least some of the pairs of pole pieces consisting of one shaded, and one unshaded, pole piece, two pairs of unlike polarity being so close that a shaded pole piece of one pair lies only one rotor-pole interval from an unshaded pole piece of the other pair, two other adjacent pairs of pole pieces having a greater spacing.

7. The combination of the immediately preceding claim wherein each pair of pole pieces lies between two pairs of the opposite polarity.

8. In combination in a synchronous motor of the class described, a magnetic rotor having a magnetically smooth, induction portion and having also a portion with 30 evenly spaced, pronounced poles, a pair of field plates each having four pairs of pole pieces, said pairs being spaced in a circle at 4 angular intervals having the proportions 8-8-8-6, the two pieces of each pair being spaced substantially 2 rotor pole intervals, a shading conductor for one pole piece of each pair, means for holding said plates parallel with said pole pieces interspaced and their circles concentric, and a coil between said field plates and around said pole pieces, said rotor lying within the circle of said pole pieces and between said plates.

9. In combination in a synchronous motor of the class described, a pair of magnetic plates, each plate having a plurality of pole-piece tongues integral with the plate and struck therefrom, said tongues extending substantially perpendicular to said plate and having their roots lying on a circle, and being cut from the portion of the plate within said circle to leave spokes joined at the center of said circle, means for spacing said plates parallel to each other with said pole pieces concentric and interspaced, a magnetic rotor surrounded by said pole pieces and rotatably supported at the center of said circle on each plate, a coil lying between said plates and encircling said pole pieces, and shading means on such of said pole pieces as will produce rotation of the rotor when said coil is energized.

10. The combination of claim 9 wherein said rotor includes a thin strip of magnetic material having regularly spaced perforations, each perforation having a dimension in the direction of motion substantially greater than half the center-to-center distance between adjacent perforations.

11. The combination of claim 9 wherein the magnetically active portion of said rotor consists of a thin rim having evenly spaced perforations along only one edge of the rim, the remainder of the rim being continuous and imperforate.

12. The combination of claim 9 wherein said rotor has a thin rim of magnetic material with a continuous, smooth, cylindrical outer surface facing said pole pieces, the interior surface of said rim having regularly spaced, tooth-like thicker portions.

FRANCIS J. LANDGRAF.
RICHARD P. LANDGRAF.

REFERENCES CITED

The following references are of record in the file of this patent:

UNITED STATES PATENTS

| Number | Name | Date |
|---|---|---|
| 1,959,391 | Spencer | May 22, 1934 |
| 2,018,677 | Kohlhagen | Oct. 29, 1935 |
| 2,191,220 | Poole | Feb. 20, 1940 |
| 2,248,285 | Reinhardt | July 8, 1941 |
| 2,250,395 | Russell | July 22, 1941 |
| 2,266,878 | Lux | Dec. 23, 1941 |
| 2,313,466 | Dicke | Mar. 9, 1943 |
| 2,421,906 | Poole | June 10, 1947 |
| 2,432,573 | Jorgensen | Dec. 16, 1947 |

FOREIGN PATENTS

| Number | Country | Date |
|---|---|---|
| 432,492 | Great Britain | July 24, 1935 |
| 558,022 | Great Britain | Dec. 15, 1943 |